United States Patent
Lando et al.

(10) Patent No.: US 7,759,821 B2
(45) Date of Patent: Jul. 20, 2010

(54) SYSTEM AND PROCESS FOR DIRECT CURRENT POWER SUPPLY OF AN ELECTRICAL NETWORK ON BOARD AN AIRCRAFT

(75) Inventors: Jean-Louis Lando, Saverdun (FR); Grigori Marguin, Toulouse (FR)

(73) Assignee: Airbus France, Toulouse (FR)

( * ) Notice: Subject to any disclaimer, the term of this patent is extended or adjusted under 35 U.S.C. 154(b) by 252 days.

(21) Appl. No.: 11/863,705

(22) Filed: Sep. 28, 2007

(65) Prior Publication Data

US 2008/0084118 A1    Apr. 10, 2008

(30) Foreign Application Priority Data

Oct. 10, 2006    (FR) .................................. 06 54183

(51) Int. Cl.
  *H02J 7/00*    (2006.01)
  *H02J 9/00*    (2006.01)
(52) U.S. Cl. .......................................... 307/66; 307/68
(58) Field of Classification Search ................... 307/66, 307/68
  See application file for complete search history.

(56) References Cited

U.S. PATENT DOCUMENTS

| | | | |
|---|---|---|---|
| 5,698,966 A | 12/1997 | Chen | |
| 5,994,795 A | 11/1999 | Gabillet | |
| 6,577,103 B2 * | 6/2003 | Tanaka et al. | 320/116 |
| 2004/0119454 A1 | 6/2004 | Chang et al. | |
| 2006/0061213 A1 | 3/2006 | Michalko | |

FOREIGN PATENT DOCUMENTS

| | | |
|---|---|---|
| DE | 103 46 796 A1 | 5/2005 |
| EP | 0 187 369 A2 | 7/1986 |
| EP | 0 874 440 A1 | 10/1998 |
| FR | 2 882 200 A1 | 8/2006 |

OTHER PUBLICATIONS

Joseph A. Weimer, "Power Management and Distribution For The More Electric Aircraft", Intersociety Energy Conversion Engineering Conference, XP000730685, vol. 1 Conf.30, Jul. 30, 1995, pp. 273-277.

* cited by examiner

*Primary Examiner*—Fritz M Fleming
*Assistant Examiner*—Dru M Parries
(74) *Attorney, Agent, or Firm*—Oblon, Spivak, McClelland, Maier & Neustadt, L.L.P.

(57) ABSTRACT

The invention relates to a system and a process for direct current power supply of electrical networks. This system comprises a system for direct current power supply of electrical networks comprising at least two generators (G1, G2), an alternating current power distribution bar (11), a direct current power distribution bar (10), wherein these two power distribution bars (11, 10) are connected to one another by a rectifier unit (12) and a battery (13). The alternating current bar (11) is connected to the generators (G1, G2) via a transfer contactor (20). The direct current power distribution bar (10) is connected to the battery (13) via a first contactor (S1) in series with a second contactor (S2) positioned in parallel with a power diode (21).

6 Claims, 8 Drawing Sheets

SYSTEM AND PROCESS FOR DIRECT CURRENT POWER SUPPLY OF AN ELECTRICAL NETWORK ON BOARD AN AIRCRAFT

TECHNICAL FIELD

This invention relates to a system and a direct current power supply for an electrical network on board an aircraft.

In the following description, to simplify the explanations, by way of example, it is an aeroplane type aircraft.

STATE OF THE PRIOR ART

Generally, the electrical distribution networks on board aeroplanes comprise two types of voltages: an alternating current voltage (AC system with 115 volts or 230 volts, 400 Hz or 360-800 Hz) and a direct current voltage (DC network with 28 volts).

The direct current network is powered either by the alternating current network, using a transformer rectifier unit, or by 28V accumulators batteries.

For reasons of operating comfort, the network architectures generally offer a function called "no-break power transfer" (NBPT) permitting the loads connected to the power distribution bars to conserve their power supply during an electrical transfer, which is to say during the replacement of a given power supply source by another source.

The no-break power transfer shown in FIG. 1 is made on the alternating current network between a generator G1 and a generator G2, wherein these two generators may be connected to an alternating current power distribution bar 11 via two switches L1 and L2. In this FIG. 1, a direct current power distribution bar 10 may be powered from this alternating current power distribution bar 11 via a transformer rectifier unit 12. It may also be powered by a battery 13 via a switch S1. When the bus bar 11 is to be disconnected from the generator G1 to connect it to the generator G2, the generator G1, which is to be disconnected, is connected in parallel with the generator G2 that takes over the power supply of the bar 11 for a short instant in order to ensure the continuity of the power supply of the electrical loads, wherein the switches L1 and L2 are then closed simultaneously for this short instant. In these conditions, all of the loads in alternating current and direct current have the continuity of the power supply in electrical energy during the switching of the sources. The direct current network is created from the alternating current network.

For electrical networks offering a constant frequency for the alternating current power distribution bats, the no-break power alternating current transfer remains a relatively simple solution as the integrated drive generators can be easily synchronised before being placed in parallel during the transfer. A transformer rectifier unit is "sufficient" to transform the alternating current energy into direct current energy and the voltage regulation is carried out upstream of the rectifier unit at a POR ("Point Of Regulation") of the alternating current power distribution bars.

With the introduction of the variable frequency, the frequencies of the VFG's ("Variable Frequency Generators") often by nature cannot be controlled, which makes it very difficult (or even impossible in most cases) to place them in parallel. Furthermore, the availability of the alternating current no-break power transfer function is limited to ground operations for reasons of having to maintain segregations between networks.

The purpose of the invention is to permit the continuity of the direct current power supply of the electrical networks during the switching of several sources, in the aeronautical field.

DESCRIPTION OF THE INVENTION

The invention relates to a system of direct current power supply of an electrical network, on board an aircraft, for example an aeroplane, comprising at least two generators, an alternating current power distribution bar, a direct current power distribution bar, wherein these two power distribution bars are connected to one another par a rectifier unit, a battery, characterised in that the alternating current power distribution bar is connected to the generators via a transfer contactor, in that the direct current power distribution bar is connected to the battery via a first contactor in series with a second contactor positioned in parallel with a power diode.

The invention also relates to a process for direct current power supply of an electrical network which uses the system of claim 1, comprising the following stages:
the alternating current power bar is powered by the first generator via the transfer contactor, wherein the direct current power bar is powered via the rectifier unit, the first contactor is closed and the second contactor remains open,
in a transition without any power cut to the direct current network, the transfer contactor is opened and the connection is made between the second generator and the alternating current power bar.

The system of the invention has many advantages:
The use of the transformer rectifier unit, the second contactor and the power diode permits a direct current "no-break power transfer" function to be created.
The use of the transformer rectifier unit, the second contactor and the power diode permits the direct current "no-break power transfer" function to be created regardless of the type or technology of battery used.
The use of the transformer rectifier unit, the second contactor and the power diode permits the direct current "no-break power transfer" function to be created both for ground and airborne use.
The second contactor permits the heat sink of the power diode to be reduced or eliminated for the case of an emergency electrical back-up. When it is necessary to switch to a high power level, the monitoring system commands the closure of this contactor when the power diode drives (power supply by the battery).
Placing the two contactors in series permits the risk of undesirable connexion of the battery with the direct current bus to be reduced when the technology or the type of battery cannot support the permanent load (for example a lithium-ion battery). This concerns failure situations in which one of the two contactors remains blocked in the closed position.
The two contactors may be electro-mechanical or electronic (MOSFET, IGBT, or other). If the second contactor uses MOSFET, the diode is incorporated into the power component by nature. The use of electronic cut elements permits the mass to be further reduced with respect to an electro-mechanical solution.

The invention also relates to a process for the direct current power supply of electrical networks using such a system comprising the following stages:
the alternating current power bar is powered by the first generator via the transfer contactor, wherein the direct current power bar is powered via the rectifier unit, the first contactor is closed and the second contactor remains open, in a transition without any power cut to the direct current system, the transfer contactor is opened and the connection is made between the second generator and the alternating current power bar.

The invention relates, finally, to an aircraft comprising the system of the invention or comprising a system capable of using the process of the invention.

DETAILED DESCRIPTION OF SPECIFIC EMBODIMENTS

Figure 1:
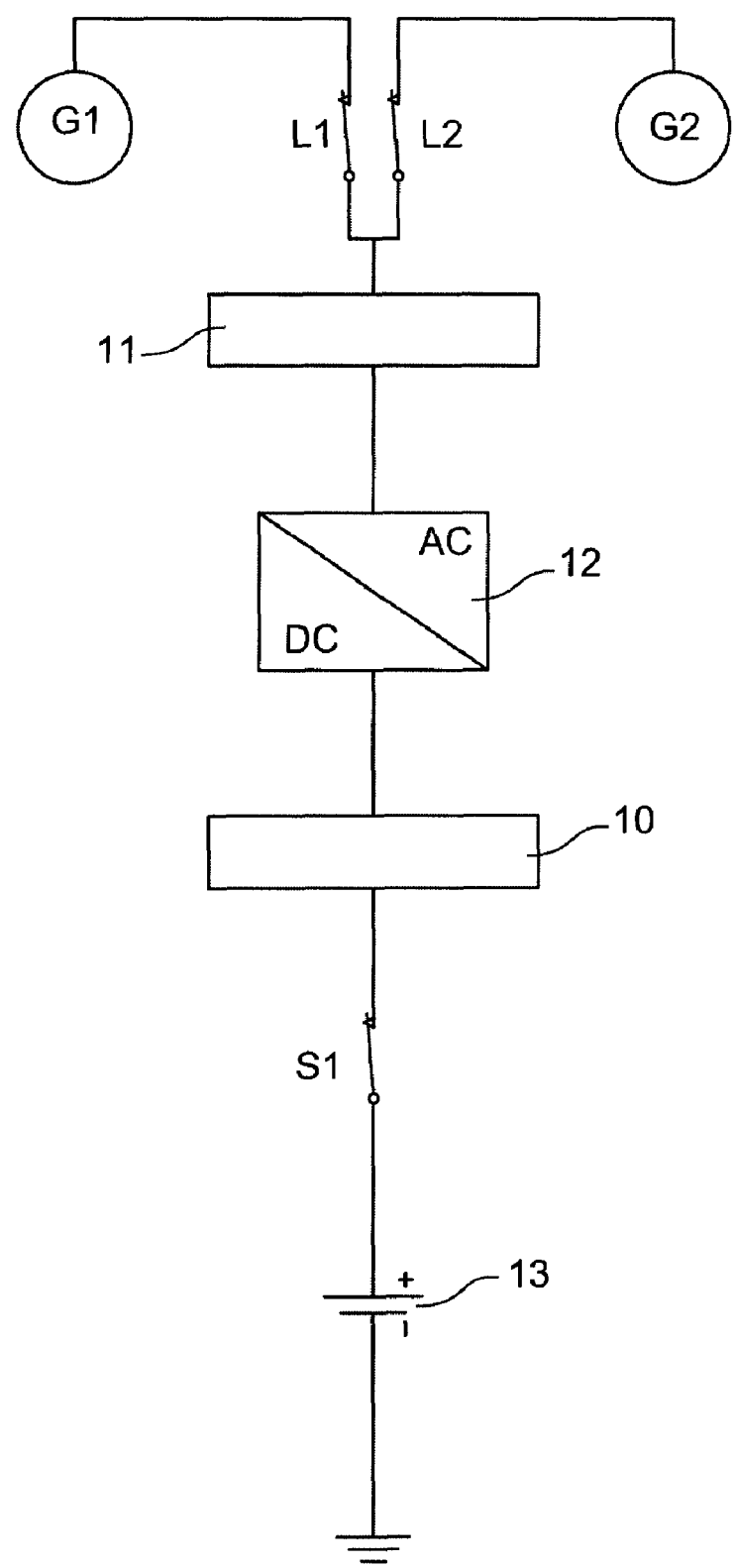
FIG. 1 illustrates a system for the direct current power supply of electrical networks of the prior art.
Figure 2:
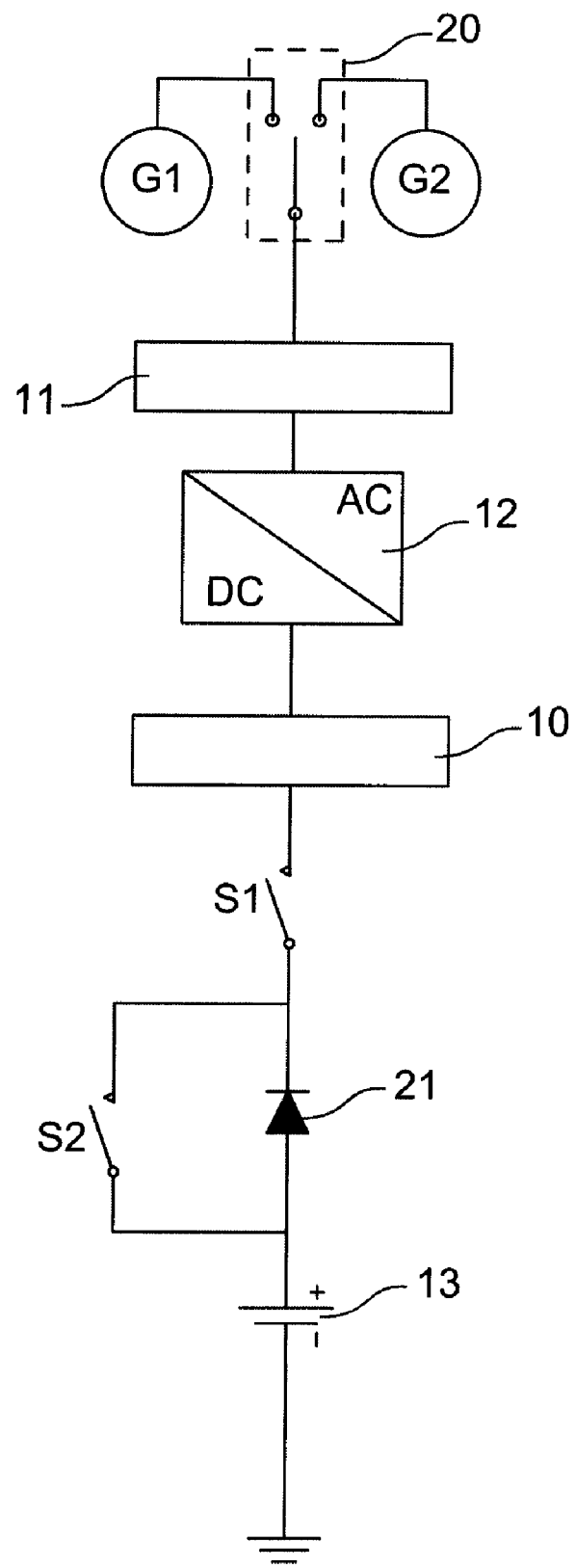
FIG. 2 illustrates the system for the direct current power supply of the invention.

FIG. 2 illustrates the general architecture of an electrical generation and distribution channel, in which the elements already shown in FIG. 1 have the same reference.

As in FIG. 1, the main source of energy is formed by a generator G1 (or G2) which powers an alternating current power distribution bar 11. However, a transfer contactor 20 permits, at this point, to carry out switching from the generator G1 to the generator G2. The direct current power distribution bar 10 may be powered via the alternating current power distribution bar 11 by means of the rectifier unit 12. It may also be powered from the battery 13 via a first contactor S1 in series with a power diode in parallel with a second contactor S2.

Figure 3A:
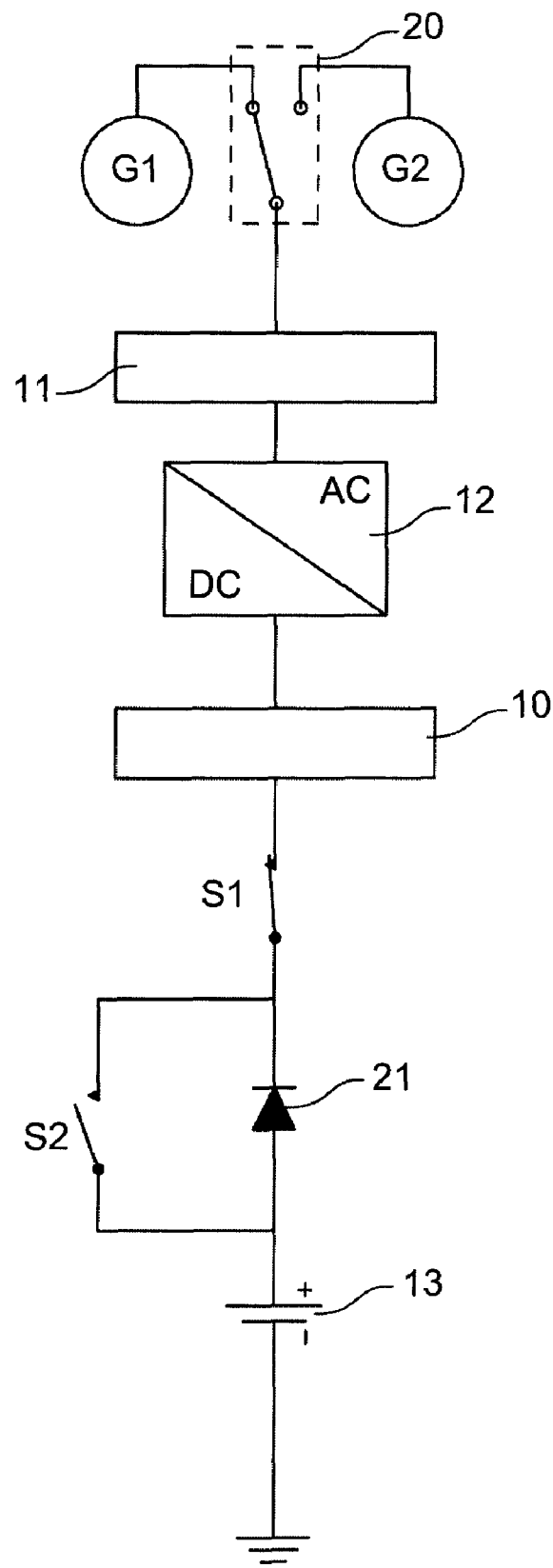
FIGS. 3A to 3D and 4A and 4B illustrate the operation of the system for the direct current power supply of the invention.

As shown in FIG. 3A, in the initial configuration of the system of the invention, the alternating current power distribution bar 11 is powered by the generator G1 via the transfer contactor 20. The direct current power distribution bar 10 is powered by the alternating current power distribution bar 11 via the rectifier unit 12. The voltage on the direct current bus is supposed to be still greater than the voltage of the battery. This condition is created, in the conception of the main generator (G1 or G2), by limiting the minimum and maximum excursions of the alternating current voltage power distribution bar 11 by adequate definition of the generator and the regulation loop excitation. The first contactor S1 is closed. The second contactor S2 is open. Consequently, the power diode 21 is inversely polarised (negative anode-cathode voltage). Therefore it does not conduct.

Figure 3B:
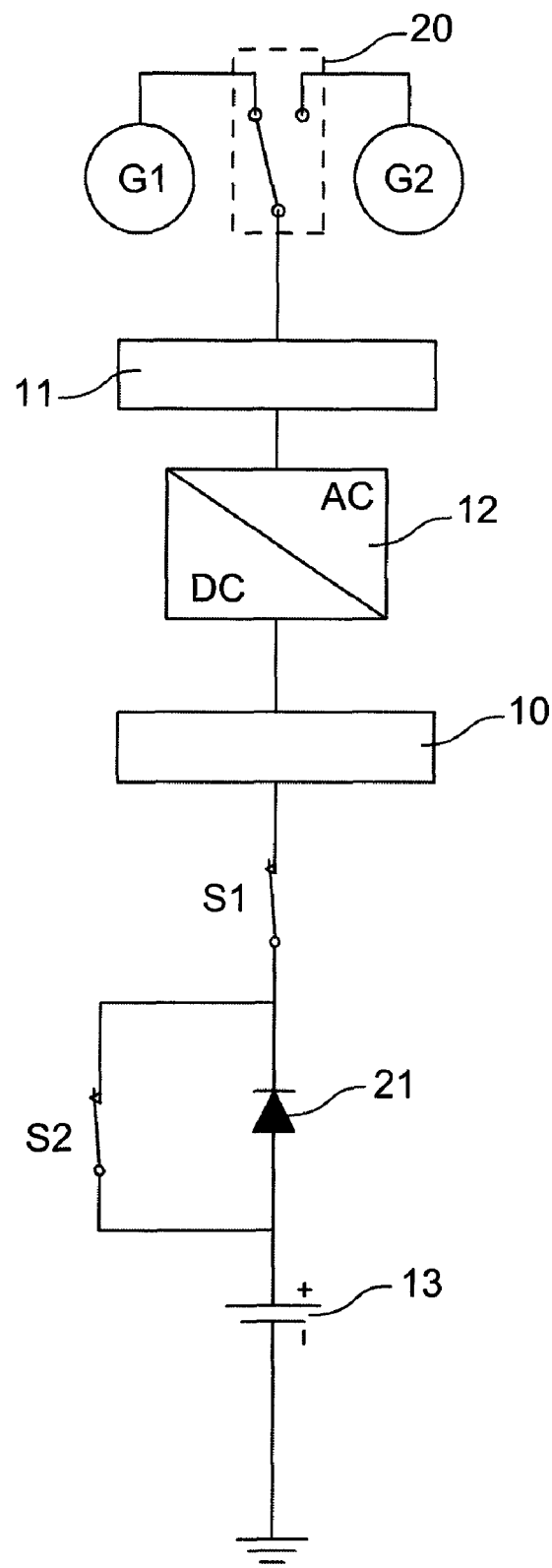

As shown in FIG. 3B, when the battery 13 needs to be recharged in order to guarantee the quantity of energy that is stored by the battery, the second contactor S2 is closed. The direct current power distribution bar 10 supplies the battery 13 with electrical energy during the time it needs to be recharged. If a short-circuit occurs on the bus of the direct current power distribution bar 10, the first contactor S1 is opened in order to isolate the battery from this bus.

Figure 3C:
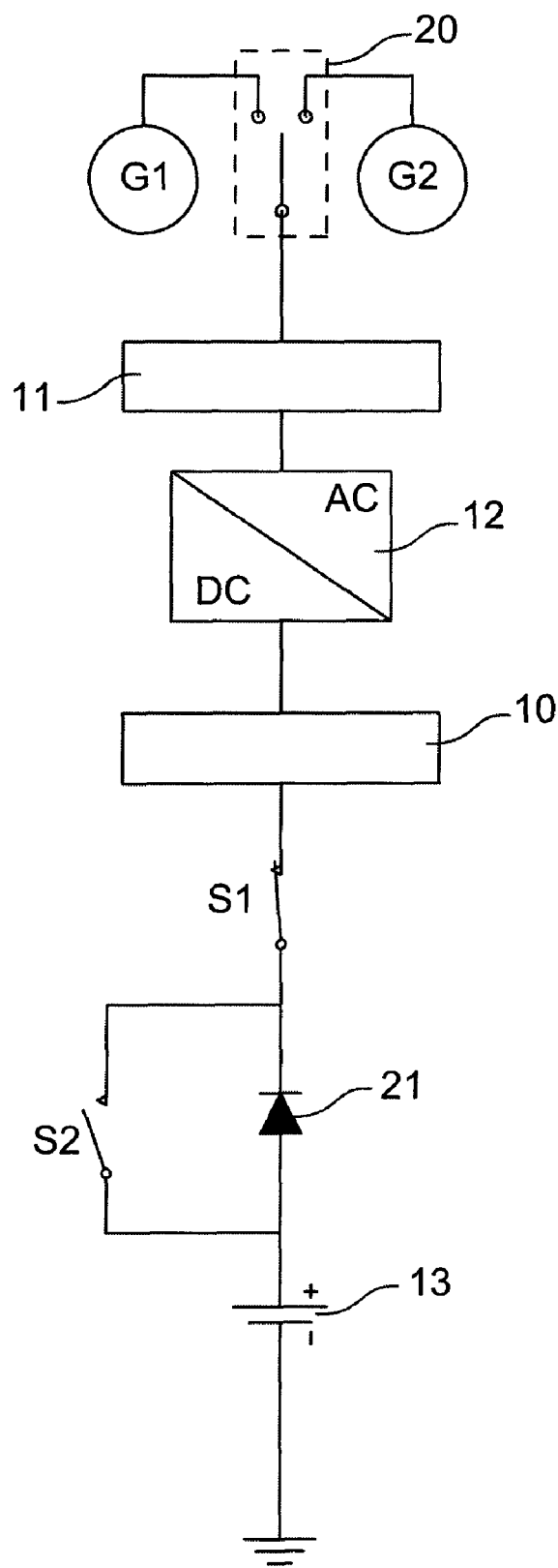

As shown in FIG. 3C, during the switching of the power supply of the alternating current power distribution bar from the generator G1 to the generator G2, a power cut occurs on the alternating current network. The alternating current power distribution bar momentarily loses its power supply and the alternating current voltage decreases progressively.

Consequently, given that the voltage on the direct current power distribution bar 10 is created from the alternating current voltage, this alternating current voltage decreases, then the direct current voltage will follow this same decrease until it is slightly lower than the voltage value of the battery. At this instant the power diode 21 starts conducting as the voltage at its terminals becomes increasingly positive.

The battery 13 discharges current instantaneously to maintain the voltage on the direct current power distribution bar by restoring the electrical energy accumulated. The equipments connected to the direct current power distribution bar 10 have experienced a slight decrease in the voltage but no interruption in the power supply. The voltage on the direct current bus is equal to the voltage battery minus the drop in voltage introduced by the power diode 13.

Figure 3D:
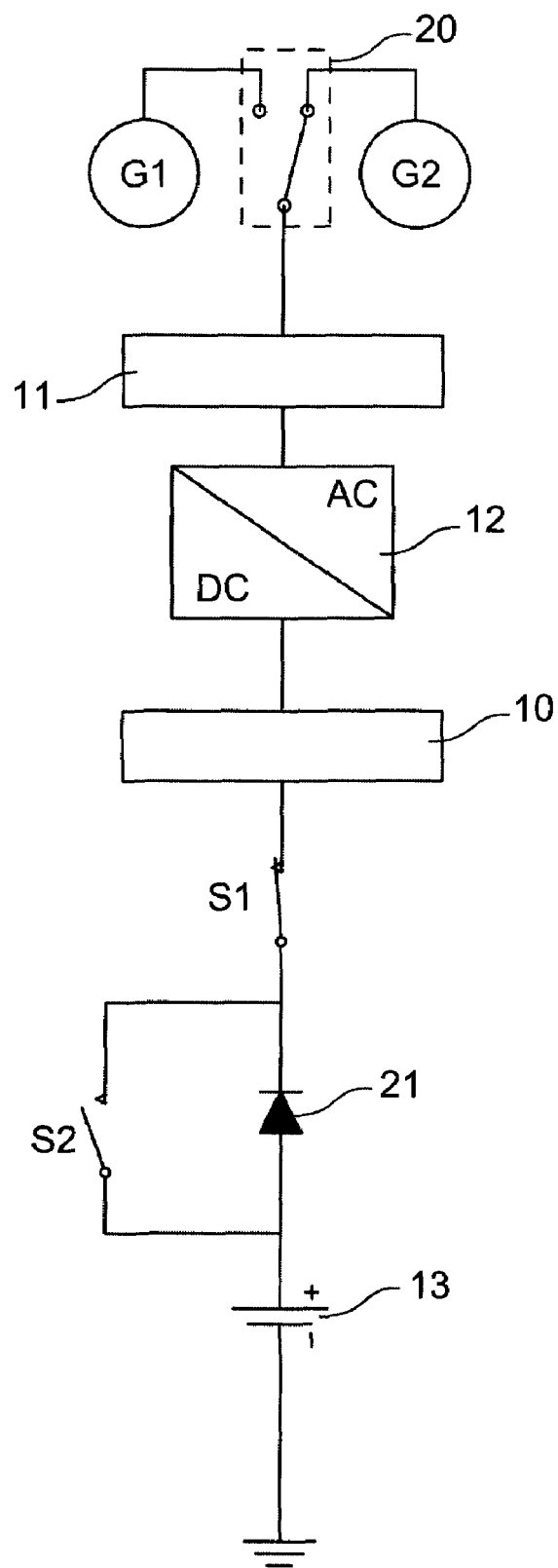

As shown in FIG. 3D, the generator G2 takes over the power supply of the alternating current power bar 11 after the switching (transfer contactor 20 in G2 position). The voltage on the direct current power bar 10 increases to a value close to or greater than the battery voltage. The voltage at the terminals of the power diode 21 is cancelled and then becomes negative. It blocks. The battery 13 is again isolated from the direct current power bar 10.

All of the equipments connected to the direct current power bar 10 are powered by the generator G2 via the rectifier unit 12. The switching between the generator G1 and the generator G2 (electrical transfer) has been made without any interruption to the direct current bus.

The battery 21 may be recharged again as previously indicated by closing the second contactor S2.

Figure 4A:
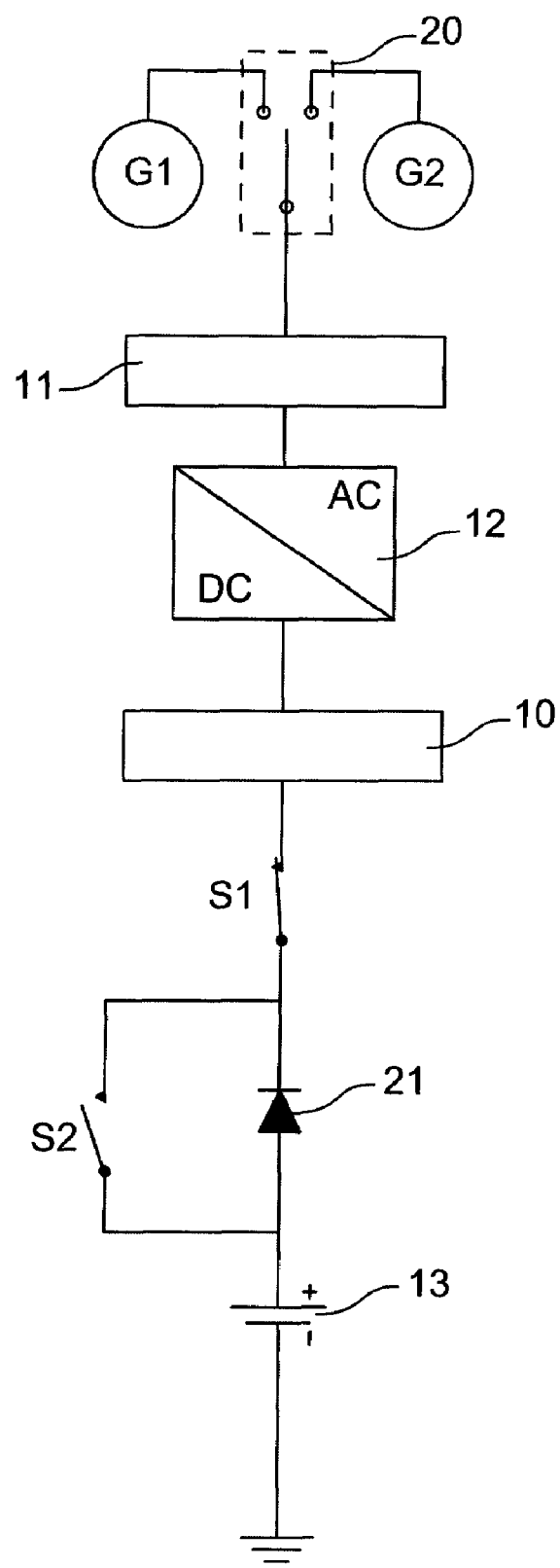

As shown in FIG. 4A, during a passage in emergency electrical back up, all of the main electrical generation sources (generators G1 and G2) are unavailable. Consequently, the alternating current power distribution bar 11 loses its power supply and the voltage on the direct current power distribution bar 10 decreases until the power diode 21 starts conducting. The battery 13 provides the continuity of the direct current voltage.

Figure 4B:
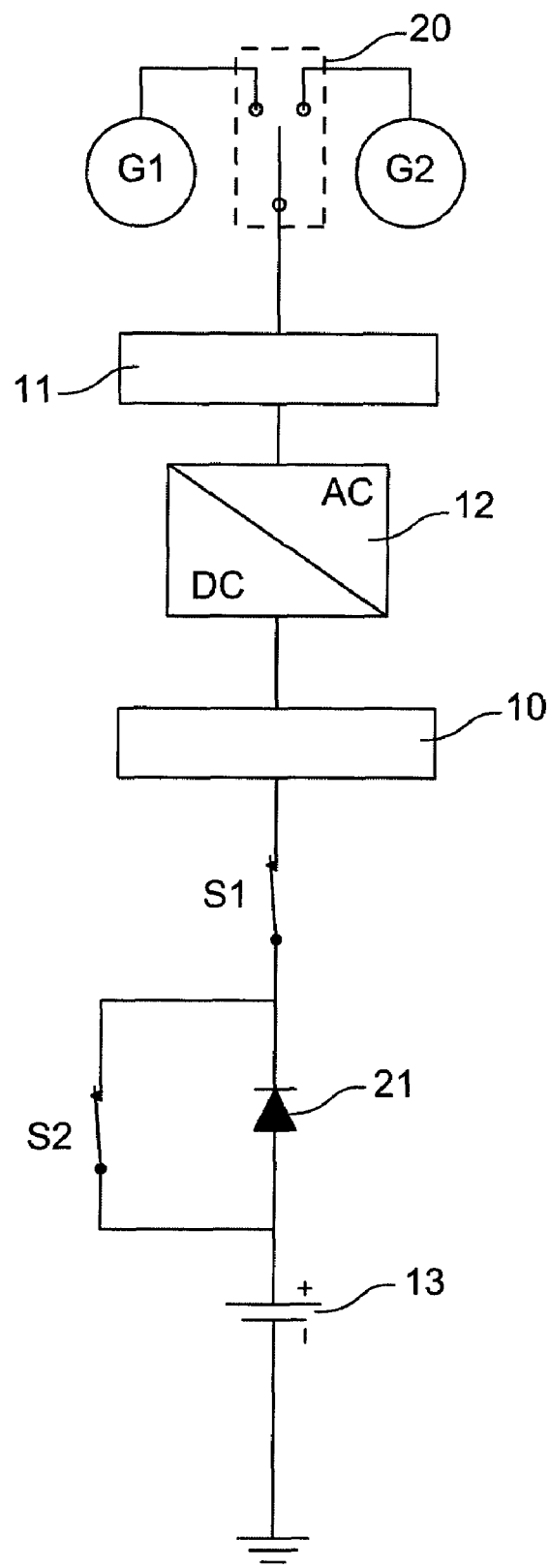

As shown in FIG. 4B, the operating principle is the same as that previously explained concerning the switching of the G1 and G2 generators, except that the transition is much longer. In fact, the use of the RAT ("Ram Air Turbine") supplying the emergency electrical back-up generator can take a few seconds. The second contactor S2 remains closed during the transitory deployment phase.

Such a characteristic has two advantages:

the first advantage is to eliminate the drop in voltage of the series diode. If the second contactor S2 is closed, the power diode is blocked and the drop in voltage between the battery and the direct current power distribution bar 11 is reduced, the second advantage is to reduce (or eliminate) the heat sink of the power diode 21 in order to reduce the mass of the system.

The invention claimed is:

1. A system for direct current power supply of an electrical network, on board an aircraft, comprising:

a first and a second alternative current generator;

a rectifier unit;

a battery;

an alternating current power distribution bar; and a direct current power distribution bar, the alternating and the direct current power distribution bars are connected to each another by the rectifier unit, wherein the alternating current power distribution bar is connected to either the first or the second alternative current generator via a transfer contactor, and wherein the direct current power distribution bar is connected to the battery via a first contactor in series with a second contactor, the second contactor being arranged in parallel with a power diode.

2. A method for direct current power supply of electrical networks using the system of claim 1, comprising the steps of:
powering the alternating current power bar by the first generator via the transfer contactor;
powering, the direct current power bar via the rectifier unit;
closing the first contactor while the second contactor is maintained in an open state;
opening the transfer contactor such that neither of the first and the second generator provides any power to the alternating current power distribution bar, so that a direct current voltage on the direct current distribution bar decreases until the power diode starts conducting; and
closing the transfer contactor such that the second generator provides power to the alternating current power distribution bar.

3. System of claim 1, in which the aircraft is an aeroplane.

4. Aircraft comprising a system of claim 1.

5. Aircraft comprising a system capable of using the process of claim 2.

6. The system of claim 1, wherein the transfer contactor is configured to provide electrical power from the first generator to the alternating current power bar, and the rectifier unit is configured to power the direct current power bar from the alternating current power bar; and the system is configured to
(a) close the first contactor while the second contactor is maintained in an open state,
(b) open the transfer contactor such that neither of the first and the second generator provides any power to the alternating current power distribution bar, so that a direct current voltage on the direct current distribution bar decreases until the power diode starts conducting, and
(c) close the transfer contactor such that the second generator provides power to the alternating current power distribution bar.

* * * * *